(12) United States Patent
Zhu et al.

(10) Patent No.: US 9,703,084 B2
(45) Date of Patent: *Jul. 11, 2017

(54) OFF-AXIAL THREE-MIRROR OPTICAL SYSTEM WITH FREEFORM SURFACES

(71) Applicants: Tsinghua University, Beijing (CN); HON HAI PRECISION INDUSTRY CO., LTD., New Taipei (TW)

(72) Inventors: Jun Zhu, Beijing (CN); Tong Yang, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 91 days.

This patent is subject to a terminal disclaimer.

(21) Appl. No.: 14/726,684

(22) Filed: Jun. 1, 2015

(65) Prior Publication Data
US 2015/0346468 A1    Dec. 3, 2015

(30) Foreign Application Priority Data
Jun. 3, 2014   (CN) .......................... 2014 1 0241550

(51) Int. Cl.
*G02B 17/06*    (2006.01)
(52) U.S. Cl.
CPC ............................... *G02B 17/0642* (2013.01)
(58) Field of Classification Search
CPC ................................................. G02B 17/0642
See application file for complete search history.

(56) References Cited

PUBLICATIONS

Tong Yang et al., "Design method of freeform off-axis reflective imaging systems with a direct construction process", Optics Express, vol. 22, Issue 8, Apr. 21, 2014, pp. 9193 to 9205.

*Primary Examiner* — Tony Ko
(74) *Attorney, Agent, or Firm* — Steven Reiss

(57) ABSTRACT

An off-axial three-mirror optical system with freeform surfaces includes a primary mirror, a secondary mirror, a tertiary mirror, and an image sensor. The primary mirror is located on an incident light path. The secondary mirror is located on a primary mirror reflecting light path. The tertiary mirror is located on a secondary mirror reflecting light path. The image sensor is located on a tertiary mirror reflecting light path. A primary mirror surface and a tertiary mirror surface are all xy polynomial freeform surfaces up to a fifth order. A secondary mirror surface is a planar surface.

16 Claims, 3 Drawing Sheets

OFF-AXIAL THREE-MIRROR OPTICAL SYSTEM WITH FREEFORM SURFACES

CROSS-REFERENCE TO RELATED APPLICATIONS

This application claims all benefits accruing under 35 U.S.C. §119 from China Patent Application No. 201410241550.2, field on Jun. 3, 2014 in the China Intellectual Property Office, disclosure of which is incorporated herein by reference. The application is also related to copending application Ser. No. 14/726/687 entitled, "OFF-AXIAL THREE-MIRROR OPTICAL SYSTEM WITH FREEFORM SURFACES", filed Jun. 1, 2015.

FIELD

The present disclosure relates to an off-axial optical system.

BACKGROUND

Compared with conventional rotationally symmetric surfaces, freeform surfaces have asymmetric surfaces and more degrees of design freedom, which can reduce the aberrations and simplify the structure of the system. In recent years, freeform surfaces are often used in off-axial three-mirror optical system.

However, conventional off-axial three-mirror optical systems with freeform surfaces are mostly applied to a small field of view, and the F-number of the system is large. In addition, a primary mirror, a secondary mirror, and a tertiary mirror in the off-axial three-mirror system are all freeform surfaces, and the primary mirror and the tertiary mirror are separate from each other; which makes the off-axial three-mirror optical systems are difficult to be assembled and fabricated.

BRIEF DESCRIPTION OF THE DRAWINGS

Implementations of the present technology will now be described, by way of example only, with reference to the attached figures.

DETAILED DESCRIPTION

Figure 1:
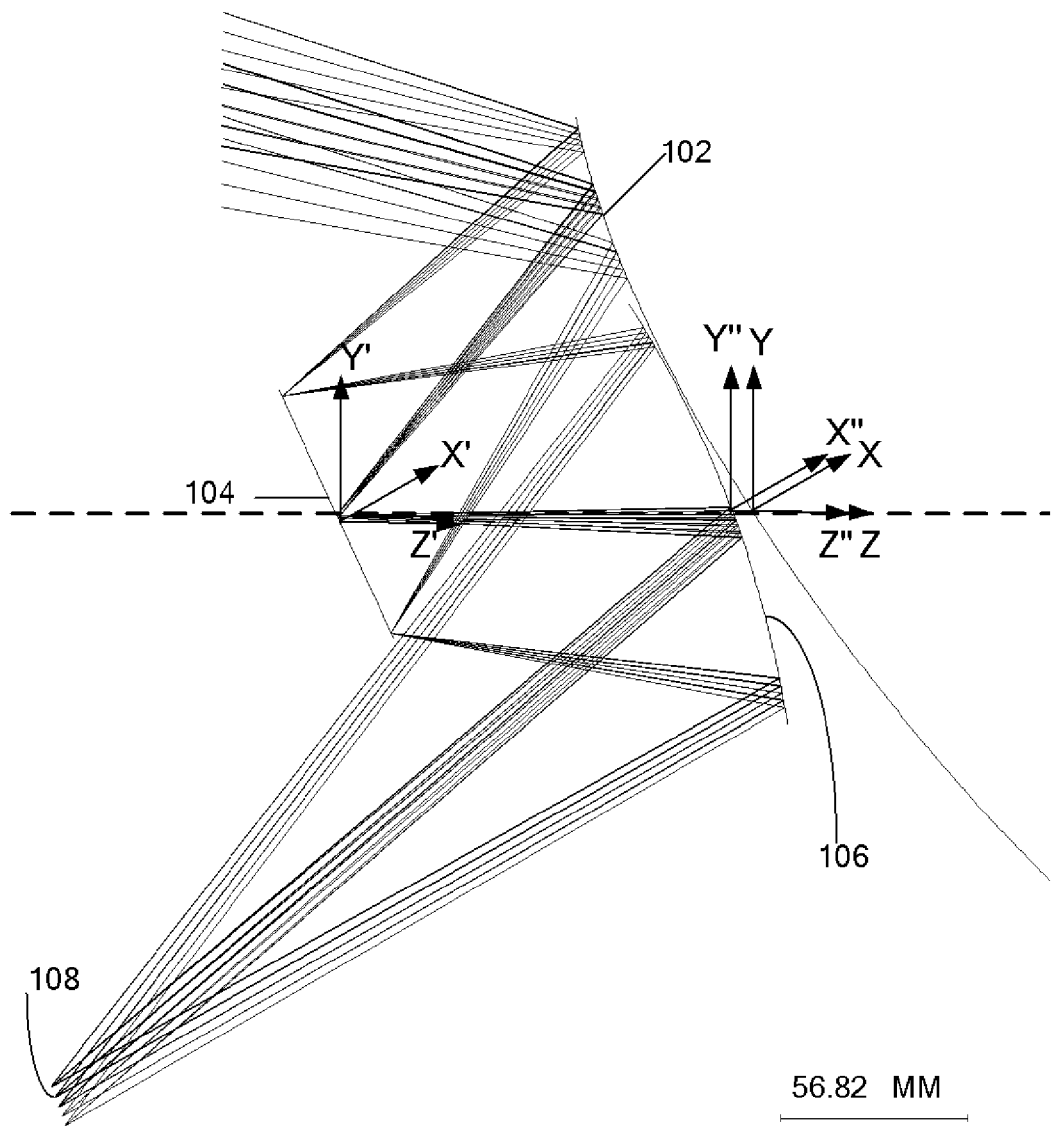
FIG. 1 is a schematic view of an off-axial three-mirror optical system with freeform surfaces configuration according to one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
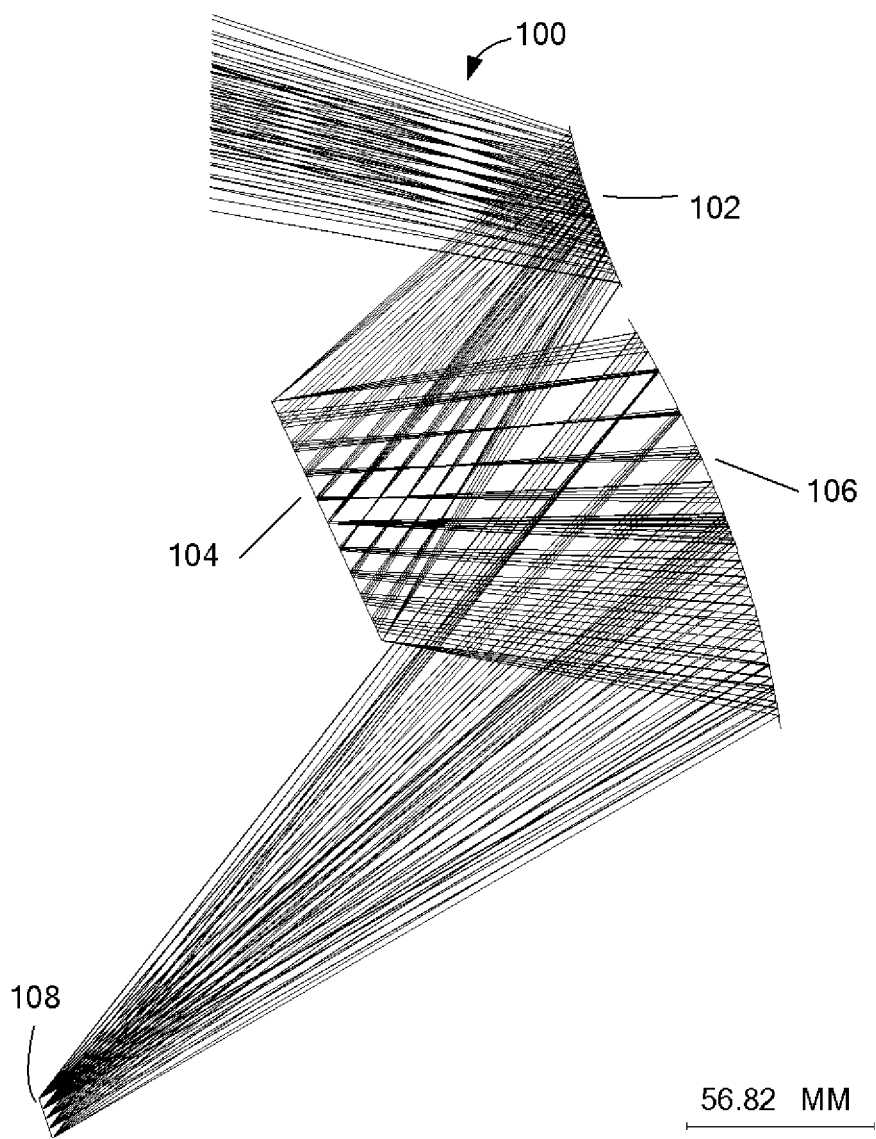
FIG. 2 is a schematic view of an off-axial three-mirror optical system with freeform surfaces light path according to one embodiment.
Figure 3:
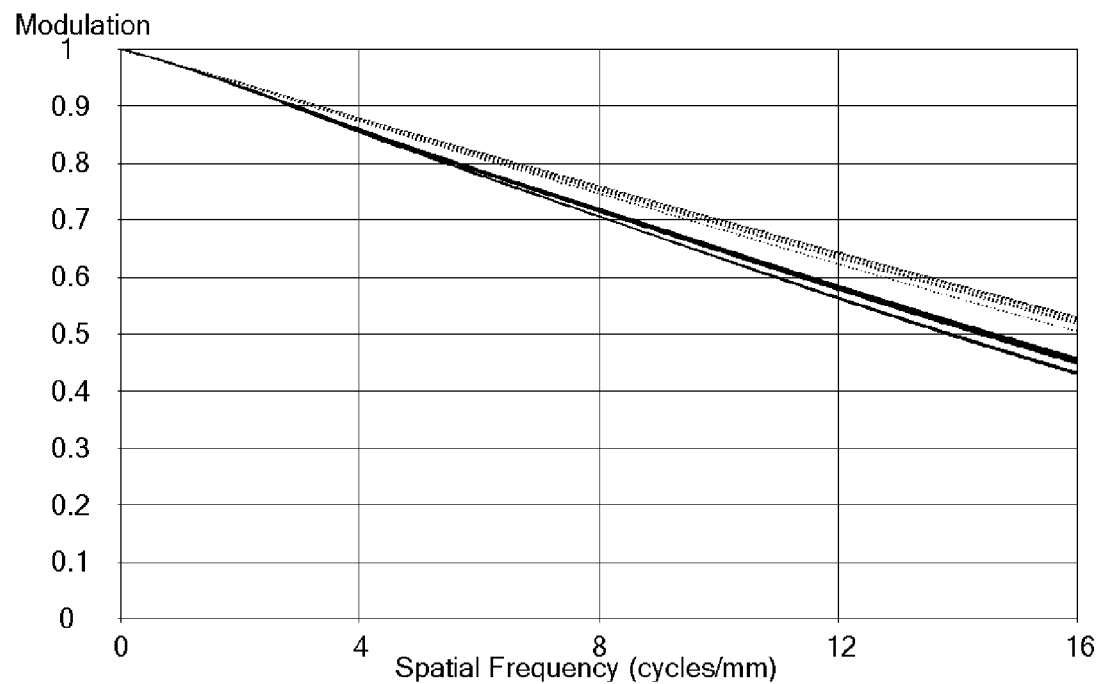
FIG. 3 is a graph showing modulation transfer function curves in long-wave infrared band of partial field angles of an off-axial three-mirror optical system with freeform surfaces according to one embodiment.

FIGS. 1-3 illustrate one embodiment of an off-axial three-mirror optical system with freeform surfaces 100 includes a primary mirror 102, a secondary mirror 104, a tertiary mirror 106, and a detector 108. The primary mirror 102 is located on an incident light path; the secondary mirror 104 is located on a primary mirror reflected light path; the tertiary mirror 106 is located on a secondary mirror reflected light path; and the detector 108 is located on a tertiary mirror reflected light path. A primary mirror reflecting surface and a tertiary mirror reflecting surface are all freeform surfaces. The secondary mirror is a stop surface. A secondary mirror reflecting surface is a planar surface.

A light path of the off-axial three-mirror optical system with freeform surfaces 100 can be depicted as follows. Firstly, an incident light reaches the primary mirror 102, and is reflected by the primary mirror 102 to form a first reflected light $R_1$. Secondly, the first reflected light $R_1$ reaches the secondary mirror 104, and is reflected by the secondary mirror 104 to form a second reflected light $R_2$. Thirdly, the second reflected light $R_2$ reaches the tertiary mirror 106, and is reflected by the tertiary mirror 106 to form a third reflected light $R_3$. Finally, the third reflected light $R_3$ is received by the detector 108 and imaging.

A first three-dimensional rectangular coordinates system (X,Y,Z) is defined by a primary mirror location; a second three-dimensional rectangular coordinates system (X',Y',Z') is defined by a secondary mirror location; and a third three-dimensional rectangular coordinates system (X",Y",Z") is defined by a tertiary mirror location.

A primary mirror vertex is a first three-dimensional rectangular coordinates system (X,Y,Z) origin. A horizontal line passing through the primary mirror vertex is defined as a Z-axis, in the Z-axis, to the left is negative, and to the right is positive. A Y-axis is in a plane shown in FIG. 1, in the Y-axis, in a direction substantially perpendicular to the Z-axis, to the upward is positive, and to the downward is negative. An X-axis is perpendicular to a YZ plane, in the X-axis, in a direction substantially perpendicular to the YZ plane, to the inside is positive, and to the outside is negative.

In the first three-dimensional rectangular coordinates system (X,Y,Z), a primary mirror surface is an xy polynomial freeform surface. An xy polynomial freeform surface equation can be expressed as follows:

$$z(x, y) = \frac{c(x^2 + y^2)}{1 + \sqrt{1 - (1 + k)c^2(x^2 + y^2)}} + \sum_{i=1}^{N} A_i x^m y^n.$$

In the equation, z represents surface sag, c represents surface curvature, k represents conic constant, while $A_i$ represents the ith term coefficient. Since the off-axial three-mirror optical system with freeform surfaces 100 is symmetrical about a YOZ plane, even-order terms of x can be only remained. At the same time, higher order terms will increase the fabrication difficulty of the off-axial three-mirror optical system with freeform surfaces 100. In one embodiment, the primary mirror surface is an xy polynomial freeform surface up to the fifth order without odd items of x. A fifth order xy polynomial freeform surface equation can be expressed as follows:

$$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y +$$
$$A_9 y^3 + A_{10} x^4 + A_{12} x^2 y^2 + A_{14} y^4 + A_{16} x^4 y + A_{18} x^2 y^3 + A_{20} y^5.$$

In one embodiment, the values of c, k, and $A_i$ in the fifth order xy polynomial freeform surface equation are listed in TABLE 1. However, the values of c, k, and $A_i$ in the fifth order xy polynomial freeform surface equation are not limited to TABLE 1.

TABLE 1

| | |
|---|---|
| c | 5.4581228779E−03 |
| k | −2.9351122500E−02 |
| $A_2$ | −6.4880997149E−01 |
| $A_3$ | −8.4098683492E−04 |
| $A_5$ | −1.3333293560E−03 |
| $A_7$ | 9.2509319707E−06 |
| $A_9$ | 8.1672537673E−07 |
| $A_{10}$ | −1.6110371752E−08 |
| $A_{12}$ | −1.4598293890E−07 |
| $A_{14}$ | −1.3753088937E−08 |
| $A_{16}$ | 5.4117613510E−10 |
| $A_{18}$ | 6.3061780739E−10 |
| $A_{20}$ | −2.3734235891E−11 |

The second three-dimensional rectangular coordinates system (X',Y',Z') is obtained by moving the first three-dimensional rectangular coordinates system (X,Y,Z) for about 127.722 mm along a Z-axis negative direction; and a secondary mirror vertex is a second three-dimensional rectangular coordinates system (X,Y,Z) origin. In other words, a distance between the first three-dimensional rectangular coordinates system (X,Y,Z) origin and the second three-dimensional rectangular coordinates system (X',Y',Z') origin is about 127.722 mm.

The secondary mirror 104 is a plane mirror. In the second three-dimensional rectangular coordinates system (X',Y',Z'), an angle between the secondary mirror 104 and an X'Y' plane along a counterclockwise direction is about 24.780°.

The third three-dimensional rectangular coordinates system (X",Y",Z") is obtained by moving the second three-dimensional rectangular coordinates system (X',Y',Z') for about 121.183 mm along a Z'-axis positive direction; and a tertiary mirror vertex is a third three-dimensional rectangular coordinates system (X",Y",Z") origin. In other words, a distance between the second three-dimensional rectangular coordinates system (X',Y',Z') origin and the third three-dimensional rectangular coordinates system (X,Y,Z) origin is about 121.183 mm.

In the third three-dimensional rectangular coordinates system (X",Y",Z"), a tertiary mirror surface is an x"y" polynomial freeform surface. An x"y" polynomial freeform surface equation can be expressed as follows:

$$z''(x'', y'') = \frac{c''(x''^2 + y''^2)}{1 + \sqrt{1 - (1+k'')c''^2(x''^2 + y''^2)}} + \sum_{i=1}^{N} A_i'' x''^m y''^n.$$

In the equation, z" represents surface sag, c" represents surface curvature, k" represents conic constant, while $A_i''$ represents the ith term coefficient. Since the off-axial three-mirror optical system with freeform surfaces 100 is symmetrical about Y"Z" plane, even-order terms of x" can be only remained. At the same time, higher order terms will increase the fabrication difficulty of the off-axial three-mirror optical system with freeform surfaces 100. In one embodiment, the tertiary mirror surface is an x"y" polynomial freeform surface up to the fifth order without odd items of x". A fifth order x"y" polynomial freeform surface equation can be expressed as follows:

$$z''(x'', y'') = \frac{c''(x''^2 + y''^2)}{1 + \sqrt{1 - (1+k'')c''^2(x''^2 + y''^2)}} +$$
$$A_2'' y'' + A_3'' x''^2 + A_5'' y''^2 + A_7'' x''^2 y'' + A_9'' y''^3 + A_{10}'' x''^4 +$$
$$A_{12}'' x''^2 y''^2 + A_{14}'' y''^4 + A_{16}'' x''^4 y'' + A_{18}'' x''^2 y''^3 + A_{20}'' y''^5.$$

In one embodiment, the values of c", k", and $A_i''$ in the fifth order x"y" polynomial freeform surface equation are listed in TABLE 2. However, the values of c", k", and A in the fifth order x"y" polynomial freeform surface equation are not limited to TABLE 3.

TABLE 2

| | |
|---|---|
| c" | −3.4476797177E−03 |
| k" | −2.8724623175E+00 |
| A2" | −3.6959918412E−01 |
| A3" | −8.2111490156E−05 |
| A5" | −1.1026138669E−04 |
| A7" | −2.1257440194E−06 |
| A9" | −2.1580606917E−06 |
| A10" | −1.5819620150E−08 |
| A12" | −3.4614018946E−08 |
| A14" | −1.8856063917E−08 |
| A16" | −2.4395788322E−11 |
| A18" | −5.2376958965E−11 |
| A20" | −2.8843154276E−11 |

The materials of the primary mirror 102, the secondary mirror 104 and the tertiary mirror 106 can be aluminum, beryllium or other metals. The materials of the primary mirror 102, the secondary mirror 104 and the tertiary mirror 106 can also be silicon carbide, quartz or other inorganic materials. A reflection enhancing coating can also be coated on the metals or inorganic materials to enhance the reflectivity performance of the three mirrors. In one embodiment, the reflection enhancing coating is a gold film. A size of the primary mirror 102, the secondary mirror 104 and the tertiary mirror 106 can be designed according to need.

A distance between a detector center and the tertiary mirror vertex along a Z'-axis negative direction is about 206.455 mm. The detector center deviates the Z-axis along a Y-axis negative direction, and a deviation is about 180.163 mm. An angle between the detector 108 and an XY plane along a counterclockwise direction is about 18.320°.

An effective entrance pupil diameter of the off-axial three-mirror optical system with freeform surfaces is about 33 mm.

The off-axial three-mirror optical system with freeform surfaces 100 adopts an off-axis field of view in a meridian direction. A field angle of the off-axial three-mirror optical system with freeform surfaces is about 6.4°×8°, wherein an angle in a sagittal direction is in a range from about −3.2° to about 3.2°, and an angle in the meridian direction is in a range from about −18° to about −10°.

An wavelength of the off-axial three-mirror optical system with freeform surfaces is not limited, in one embodiment, the wavelength is in a range from about 8 μm to about 12 μm.

An effective focal length (EFL) of the off-axial three-mirror optical system with freeform surfaces is about 90 mm.

FIG. 3 illustrates off-axial three-mirror optical system with freeform surfaces modulation transfer functions (MTF) in long-wave infrared band of partial field angles are close to the diffraction limit. It shows that an off-axial three-mirror optical system with freeform surfaces imaging quality is high.

The off-axial three-mirror optical system with freeform surfaces 100 has many advantages as follows:

The off-axial three-mirror optical system with freeform surfaces 100 has larger field angle compared with coaxial three-mirror optical systems, the field angle is about 6.4°×8°; thereby enabling the off-axial three-mirror optical system with freeform surfaces 100 has larger rectangular field of view, and larger imaging range.

Since a primary mirror spatial location and a tertiary mirror spatial location are approximate continuous tangent, the primary mirror and the tertiary mirror can be fabricated on one element; and the off-axial three-mirror optical system with freeform surfaces 100 is easier to be assembled and aligned.

Since the secondary mirror 104 is a plane mirror, the alignment difficulty is reduced, and the off-axial three-mirror optical system with freeform surfaces 100 is easy to be obtained.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. An off-axial three-mirror optical system with freeform surfaces comprising:
a primary mirror located on an incident light path, and configured to reflect an incident light to form a first reflected light; and a first three-dimensional rectangular coordinates system (X, Y, Z) is defined by a primary mirror vertex as a first origin;
a secondary mirror located on a first reflected light path, and configured to reflect the first reflected light to form a second reflected light; a secondary mirror reflecting surface is a stop surface; a second three-dimensional rectangular coordinates system (X', Y', Z') is defined by a secondary mirror vertex as a second origin; and the second three-dimensional rectangular coordinates system (X', Y', Z') is obtained by moving the first three-dimensional rectangular coordinates system (X, Y, Z) along a Z-axis negative direction;
a tertiary mirror located on a second reflected light path, and configured to reflect the second reflected light to form a third reflected light; a third three-dimensional rectangular coordinates system (X", Y", Z") is defined by a tertiary mirror vertex as a third origin; and the third three-dimensional rectangular coordinates system (X", Y", Z") is obtained by moving the second three-dimensional rectangular coordinates system (X', Y', Z') along a Z'-axis positive direction; and
a detector located on a third reflected light path and configured to receive the third reflected light;
wherein a primary mirror surface is an xy polynomial freeform surface up to a fifth order, and an xy polynomial freeform surface equation is $$z(x, y) = \frac{c(x^2 + y^2)}{1 + \sqrt{1 - (1+k)c^2(x^2+y^2)}} + A_2 y + A_3 x^2 + A_5 y^2 + A_7 x^2 y +$$
$$A_9 y^3 + A_{10} x^4 + A_{12} x^2 y^2 + A_{14} y^4 + A_{16} x^4 y + A_{18} x^2 y^3 + A_{20} y^5,$$

wherein, c represents surface curvature, k represents conic constant, and $A_2 \sim A_{20}$ represent coefficients; a tertiary mirror surface is an x"y" polynomial freeform surface up to a fifth order, and an x'y' polynomial freeform surface equation is $$z''(x'', y'') = \frac{c''(x''^2 + y''^2)}{1 + \sqrt{1 - (1+k'')c''^2(x''^2+y''^2)}} +$$
$$A_2'' y'' + A_3'' x''^2 + A_5'' y''^2 + A_7'' x''^2 y'' + A_9'' y''^3 + A_{10}'' x''^4 +$$
$$A_{12}'' x''^2 y''^2 + A_{14}'' y''^4 + A_{16}'' x''^4 y'' + A_{18}'' x''^2 y''^3 + A_{20}'' y''^5,$$

wherein c" represents surface curvature k" represents conic constant and $A_2''\sim A_{20}''$ represent coefficients; and a secondary mirror surface is a planar surface.

2. The system as claimed in claim 1, wherein c=5.4581228779E-03, k=−2.9351122500E-02, $A_2$=−6.4880997149E-01, $A_3$=−8.4098683492E-04, $A_5$=−1.3333293560E-03, $A_7$=9.2509319707E-06, $A_9$=8.1672537673E-07, $A_{10}$=−1.6110371752E-08, $A_{12}$=−1.4598293890E-07, $A_{14}$=−1.3753088937E-08, $A_{16}$=5.4117613510E-10, $A_{18}$=6.3061780739E-10, and $A_{20}$=−2.3734235891E-11.

3. The system as claimed in claim 1, wherein an angle between the secondary mirror and an X'Y' plane along a counterclockwise direction is about 24.780°.

4. The system as claimed in claim 1, wherein c"=−3.4476797177E-03, k"=−2.8724623175E+00, $A_2''$=−3.6959918412E-01, $A_3''$=−8.2111490156E-05, $A_5''$=−1.1026138669E-04, $A_7''$=−2.1257440194E-06, $A_9''$=−2.1580606917E-06, $A_{10}''$=−1.5819620150E-08, $A_{12}''$=−3.4614018946E-08, $A_{14}''$=−1.8856063917E-08, $A_{16}''$=−2.4395788322E-11, $A_{18}''$=−5.2376958965E-11, $A_{20}''$=−2.8843154276E-11.

5. The system as claimed in claim 1, wherein a distance between the first origin and the second origin is about 127.722 mm.

6. The system as claimed in claim 1, wherein a distance between the second origin and the third origin is about 121.183 mm.

7. The system as claimed in claim 1, wherein an angle between the detector and an XY plane along a counterclockwise direction is about 18.320°.

8. The system as claimed in claim 1, wherein a distance between a detector center and the tertiary mirror vertex along a Z'-axis negative direction is about 206.455 mm.

9. The system as claimed in claim 8, wherein the detector center deviates the Z-axis along a Y-axis negative direction, and a deviation is about 180.163 mm.

10. The system as claimed in claim 1, wherein a field angle is about 6.4°×8°.

11. The system as claimed in claim 10, wherein an angle in a sagittal direction is in a range from about −3.2° to about 3.2°.

12. The system as claimed in claim 10, wherein an angle in a meridian direction is in a range from about −18° to about −10°.

13. The system as claimed in claim 1, wherein an effective entrance pupil diameter is about 33 mm.

14. The system as claimed in claim 1, wherein a wavelength is in a range from about 8 μm to about 12 μm.

15. The system as claimed in claim 1, wherein an effective focal length is about 90 mm.

16. A freeform surface reflective scanning system comprising:
 a primary mirror located on an incident light path;
 a secondary mirror located on a primary mirror reflective light path;
 a tertiary mirror located on a secondary mirror reflective light path; and
 a detector located on a tertiary mirror reflecting light path,
 wherein a primary mirror surface and a tertiary mirror surface are all xy polynomial freeform surfaces up to a fifth order, and a secondary mirror surface is a planar surface; and an xy polynomial freeform surface equation is $$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y + A_9 y^3 + A_{10} x^4 + A_{12} x^2 y^2 + A_{14} y^4 + A_{16} x^4 y + A_{18} x^2 y^3 + A_{20} y^5,$$

in the xy polynomial freeform surface equation, c represents surface curvature, k represents conic constant, and $A_2 \sim A_{20}$ represent coefficients.

\* \* \* \* \*